United States Patent [19]

Suzuki

[11] Patent Number: 5,179,360
[45] Date of Patent: Jan. 12, 1993

[54] TRANSMITTING/RECEIVING APPARATUS SWITCHABLE BETWEEN DIGITAL AND ANALOG MODULATION MODES

[75] Inventor: Mitsuhiro Suzuki, Tokyo, Japan
[73] Assignee: Sony Corporation, Tokyo, Japan
[21] Appl. No.: 854,149
[22] Filed: Mar. 20, 1992

[30] Foreign Application Priority Data

Mar. 20, 1991 [JP] Japan .................................. 3-081946

[51] Int. Cl.$^5$ ...................... H04B 1/40; H04L 27/20; H04L 27/22
[52] U.S. Cl. .................................... 332/103; 329/306; 329/316; 329/323; 329/341; 332/119; 375/67; 375/84; 455/74; 455/83; 455/86; 455/93; 455/110; 455/143; 455/144; 455/337
[58] Field of Search ...................... 455/42, 74, 83, 84, 455/86, 87, 93, 110, 142, 143, 144, 214, 216, 337; 375/52, 56, 67, 80, 83, 84; 332/103, 117, 119; 329/304, 306, 315, 316, 323, 341

[56] References Cited

U.S. PATENT DOCUMENTS 4,903,257 2/1990 Takeda et al. ..................... 455/83 X Primary Examiner—Siegfried H. Grimm
Attorney, Agent, or Firm—Jerry A. Miller

[57] ABSTRACT

Upon transmission, when the digital transmission mode is set, an analog audio signal is A/D converted, the digital audio signal is coded, a first carrier is modulated by the coded signal and multiplied by a first multiplier, and the multiplied signal is sent to an orthogonal modulating and D/A converting circuit. When the analog transmission mode is set, a second carrier is modulated by the digital audio signal and multiplied by a second multiplier, and the multiplied signal is sent to the orthogonal modulating and D/A converting circuit. A signal of a frequency which is equal in both of the digital transmission mode and the analog transmission mode is given to the orthogonal modulating and D/A converting circuit. Upon reception, when the digital transmission mode is set, an output of an A/D converting and orthogonal demodulating circuit is frequency divided by a first frequency divider and demodulated and decoded. When the analog transmission mode is set, the output of the A/D converting and orthogonal demodulating circuit is frequency divided by a second frequency divider and demodulated. A frequency of a reference frequency signal is set to a common multiple of a coding rate of the A/D converter, the frequency of the first carrier, and the frequency of the second carrier, so that a necessary signal of each section can be easily formed from an output of a reference frequency signal generator.

16 Claims, 4 Drawing Sheets

TRANSMITTING/RECEIVING APPARATUS SWITCHABLE BETWEEN DIGITAL AND ANALOG MODULATION MODES

BACKGROUND OF THE INVENTION

2. Field of the Invention

The invention relates to a transmitting apparatus and a receiving apparatus which are suitable for use in an automobile cellular telephone terminal which can cope with both of a digital transmission mode and an analog transmission mode.

2. Description of the Prior Art

A conventional automobile cellular telephone uses an analog system whereby an analog audio signal is frequency modulated and is transmitted and received by using a radio wave of, e.g., a band of 800 MHz. According to the automobile cellular telephone of the analog system, however, there is a limitation in expansion of a system capacity and it is difficult to cope with an increase in number of subscribers. A development, therefore, of an automobile cellular telephone of the digital system is being progressed.

Standardization of the specifications of the automobile cellular telephone of the digital type is being progressed in each country. For instance, according to the system of North America, the digital audio signal is high efficient encoded by using a VSELP (vector Sum Excited Linear Prediction) as a high efficient coding using, for instance, a coding system of the analysis synthesizing system as a base. The high efficient coded audio signal is $\pi/4$ shift QPSK modulated and transmitted by using a band of 800 MHz. A TDMA (Time Division Multiplexing Access) is used as an accessing method. A channel interval is set to, e.g., 30 kHz.

Development of an automobile cellular telephone terminal of the dual mode which can cope with both of the digital system and the analog system is being progressed. A number of signals of different frequencies are needed in such an automobile cellular telephone terminal of the dual mode which can cope with the digital and analog systems.

That is, in the digital system, a clock signal to sample the audio signal is needed. A sampling frequency of the audio signal is set to 8 kHz. A modulation rate in the digital mode is set to 24.3 kHz. In the analog system, wide band data can be transmitted. A data rate of the wide band data is set to 20 kHz. A channel frequency of every 30 kHz is set. Further, a carrier of a digital frequency modulator is needed in the automobile cellular telephone of the dual mode which can cope with digital and analog systems.

OBJECTS AND SUMMARY OF THE INVENTION

It is, therefore, an object of the invention to provide a transmitting apparatus and a receiving apparatus in which a number of signals of necessary frequencies can be easily generated by one reference signal generator.

According to the invention, there is provided a transmitting apparatus comprising: A/D converting means for converting an input audio signal into a digital audio signal; mode setting means which is switched between a digital transmission mode to transmit a digitally modulated audio signal and an analog transmission mode to transmit an analog modulated audio signal; digital transmission signal processing means to which the digital audio signal is given when the mode setting means is set to the digital transmission mode and which encodes the digital audio signal and modulates a first carrier by the coded signal; analog transmission signal processing means which modulates a second carrier by the digital audio signal when the mode setting means is set to the analog transmission mode; first multiplying means for multiplying a frequency of an output signal of the digital transmission signal processing means by integer times; a second multiplying means for multiplying a frequency of an output signal of the analog transmission signal processing means by integer times; orthogonal modulating and D/A converting means for orthogonal modulating an output of the first multiplying means or an output of the second multiplying means and for D/A converting; and reference signal generating means for supplying the signals of necessary frequencies to the A/D converting means, digital transmission signal processing means, and analog transmission signal processing means on the basis of a reference frequency signal, wherein a frequency of the reference frequency signal is set so as to have a relation of a common multiple of a coding rate of the A/D converting means, a frequency of the first carrier, and a frequency of the second carrier.

According to the invention, there is also provided a receiving apparatus comprising: A/D converting and orthogonal demodulating means for A/D converting a reception signal and for orthogonal demodulating; mode setting means which is switched between a digital transmission mode to receive a digitally modulated audio signal and an analog transmission mode to receive an analog modulated audio signal; first frequency dividing means to which an output of the A/D converting and orthogonal demodulating means is supplied and which forms a signal of a first carrier frequency; second frequency dividing means to which the output of A/D converting and orthogonal demodulating means is supplied and which forms a signal of a second carrier frequency; digital reception signal processing means for demodulating an output of the first frequency dividing means when setting means is set into the digital transmission mode and for decoding the demodulated signal and forming a first digital audio signal; analog audio signal processing means for demodulating an output of the second frequency dividing means when the mode setting means is set into the analog transmission mode and for forming a second digital audio signal; D/A converting means for converting the first or second digital audio signal from the digital reception signal processing means or the analog reception signal processing means into an analog audio signal; and reference signal generating means for supplying signals of necessary frequencies to the digital reception signal processing means the analog reception signal processing means, and the D/A converting means, wherein a frequency of a reference frequency signal is set so as to have a relation of a common multiple of the frequency of the first carrier, the frequency of the second carrier, and a coding rate of the digital audio signal.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

An embodiment of the invention will be described hereinbelow with reference to the drawings.

Figure 1A:
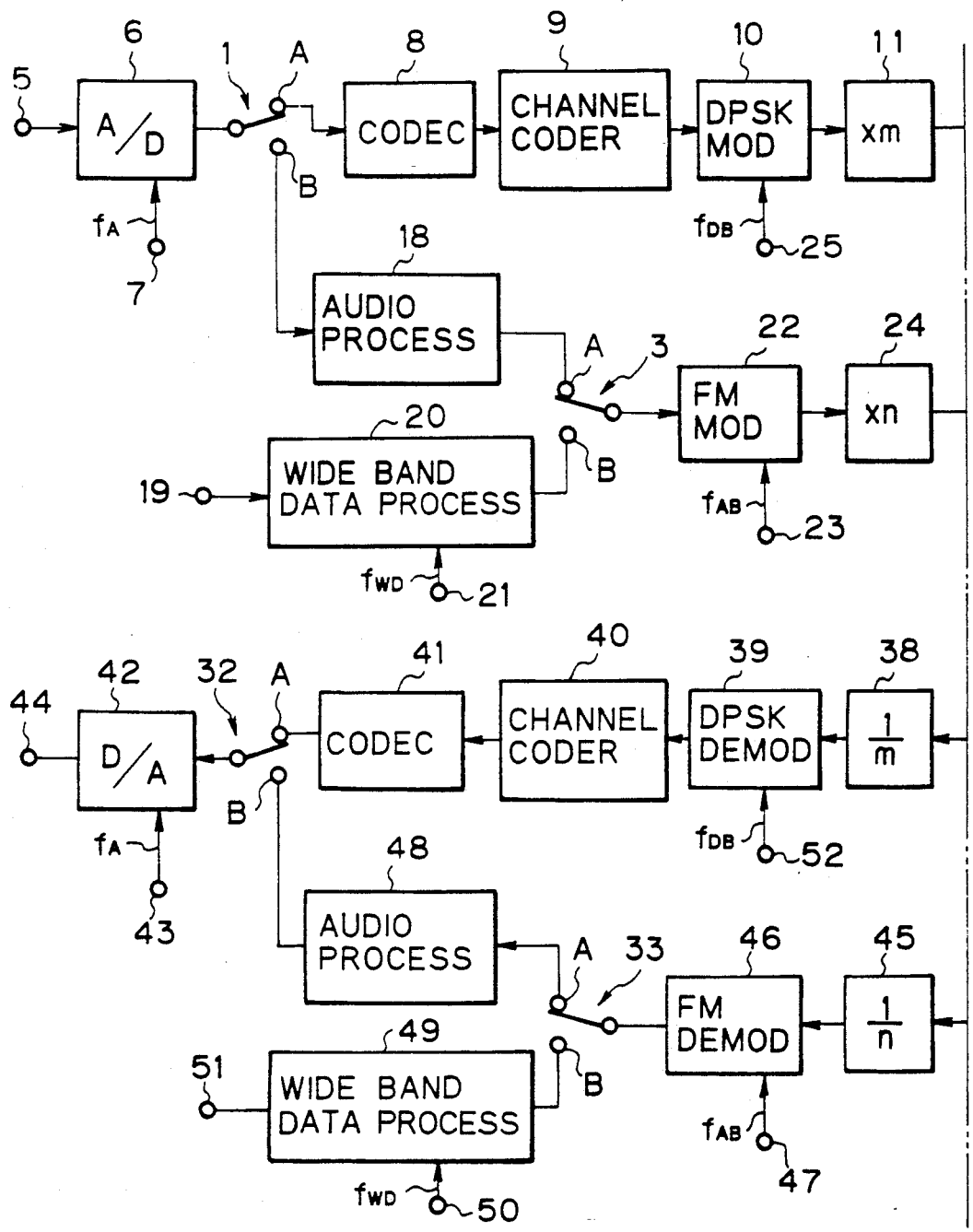
FIG. 1 consisting of FIGS. 1A and 1B, is a block diagram of an embodiment of the invention.
Figure 1B:
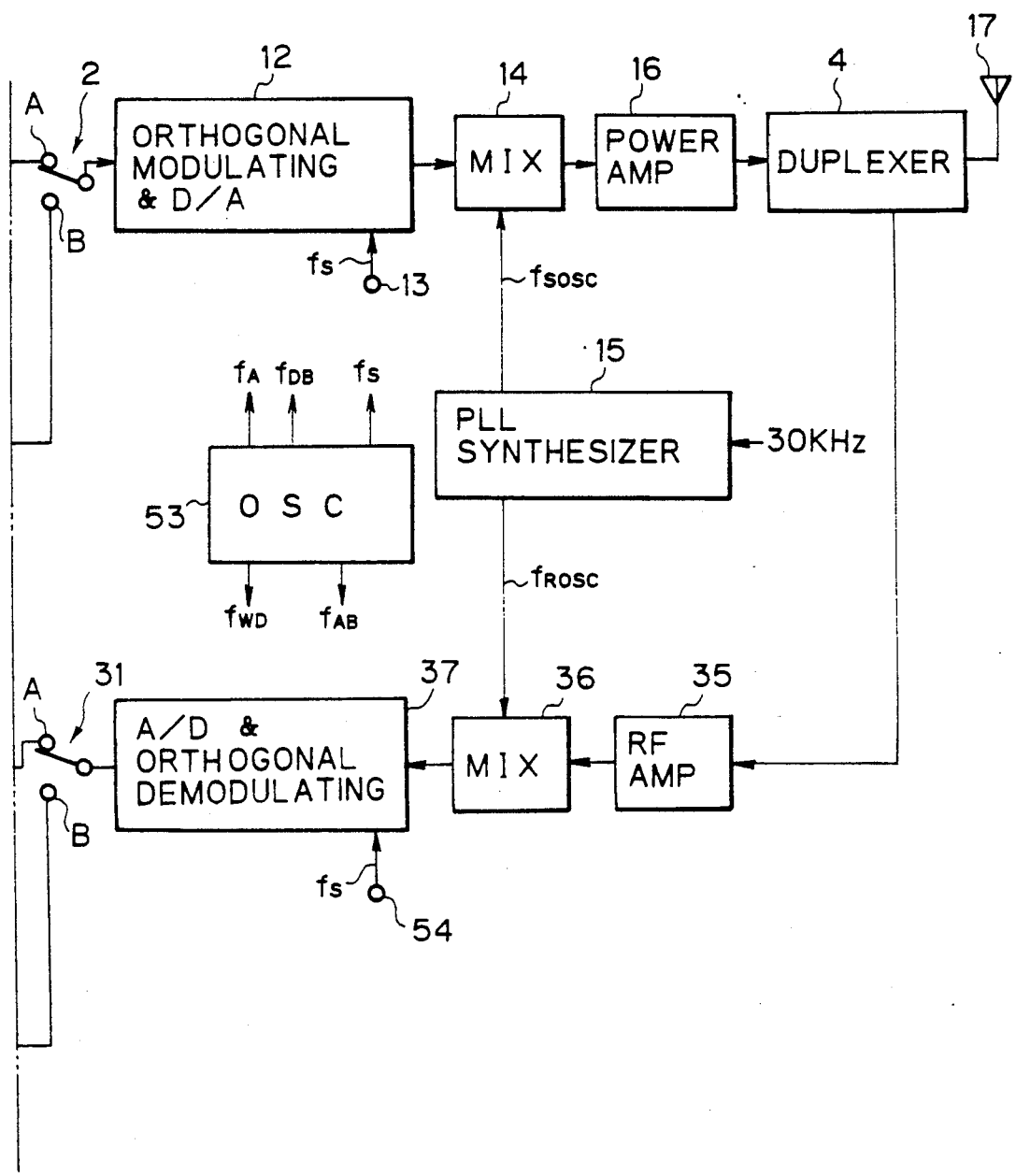

FIG. 1 shows an example of a digital automobile cellular telephone terminal of the North America system to which the invention can be applied. In the embodiment, two modes of the digital transmission system and the analog transmission system can be set.

In FIG. 1, switching circuits 1 and 2 are switches which are switched on the transmission side in accordance with the digital transmission mode and the analog transmission mode. In the digital transmission mode, the switching circuits 1 and 2 are connected to A side. In the analog transmission mode, the switching circuits 1 and 2 are connected to B side.

A switching circuit 3 is a switch which is switched in accordance with the case of the audio transmission and the case of the wide band data transmission in the analog transmission mode. In the audio transmission mode, the switching circuit 3 is connected to A side. In the wide band data transmission mode, the switching circuit 3 is connected to B side.

The transmission side in the digital transmission mode will be first described. In FIG. 1, an audio signal is supplied to an input terminal 5. The audio signal is supplied to an A/D converter 6. A sampling clock ($f_A = 8$ kHz) of a frequency $f_A$ is supplied to the A/D converter 6 from a terminal 7. The audio signal from the input terminal 5 is converted into the digital signal by the A/D converter 6 by the sampling frequency $f_A$ (8 kHz).

In the case of the digital transmission mode, the switching circuit 1 is connected to A side. In the case of the digital mode, therefore, the digital audio signal is supplied to a codec 8 through the switching circuit 1. In the codec 8, the digital audio signal is high efficient encoded by using a VSELP (vector Sum Excited Linear Prediction) as a high efficient code using the coding method of the analysis synthesizing system as a base.

The signal which has been high efficient encoded by the codec 8 is supplied to a channel coder 9. The channel coder 9 executes an assembling process from audio data, control data, or the like to a TDMA frame. Data is generated from the channel coder 9 at a modulation rate of a frequency of 24.3 kHz. The output data of the channel coder 9 is supplied to a DPSK modulating circuit 10.

A carrier ($f_{DB} = 97.2$ kHz) of a frequency $f_{DB}$ is supplied from a terminal 25 to the DPSK modulating circuit 10. The data from the channel coder 9 is DPSK modulated by the DPSK modulating circuit 10.

An output of the DPSK modulating circuit 10 is supplied to an m-times (m = 100) multiplying circuit 11. A frequency of the output signal of the DPSK modulating circuit 10 is multiplied with m times by the m-times multiplying circuit 11. Since the frequency $f_{DB}$ of the output signal of the DPSK modulating circuit 10 is equal to 97.2 kHz, a signal of a frequency of 9.72 MHz (97.2 kHz × 100) is generated from the m-times multiplying circuit 11. An output of the m-times multiplying circuit 11 is supplied to an input terminal on the A side of the switching circuit 2.

In the case of the digital mode, the switching circuit 2 is connected to A side. Therefore, the output of the m-times multiplying circuit 11 is supplied to an orthogonal modulating and D/A converting circuit 12 through the switching circuit 2. A signal of a frequency $f_S$ ($f_S = 9.72$ MHz) is supplied to the circuit 12 from a terminal 13. The orthogonal modulating and D/A converting circuit 12 sequentially selects positive and negative signals I and $-I$ of the real part of a complex base band signal and positive and negative signals Q and $-Q$ of the imaginary part by the sampling frequency $f_S$ and D/A converts and extracts the components of a predetermined band, thereby executing the orthogonal modulation and the D/A conversion. The orthogonal modulating and the D/A converting circuit 12 will be described in detail hereinbelow.

An IF signal of an intermediate frequency $f_{IF}$ (12.15 MHz) is derived from the circuit 12. The IF signal is supplied to a mixing circuit 14. A local oscillation signal of a frequency $f_{SOSC}$ is supplied from a PLL synthesizer 15 to the mixing circuit 14. The mixing circuit 14 mixes the IF signal and the local oscillation signal, thereby forming a transmission signal of a band of a frequency of 800 MHz. The transmission signal is supplied to a power amplifier 16 and amplified. An output of the power amplifier 16 is supplied to an antenna 17 through a duplexer 4.

The transmission side in the analog mode will now be described. In the analog mode, the audio signal is supplied to the input terminal 5 in the audio transmission mode. The audio signal is supplied to the A/D converter 6. A sampling clock of the frequency $f_A$ ($f_A = 8$ kHz) is supplied from the terminal 7 to the A/D converter 6. The A/D converter 6 converts the audio signal from the input terminal 5 into the digital signal by the frequency of 8 kHz.

In the analog mode, the switching circuit 1 is connected to B side. Therefore, in the analog mode, the digital audio signal is supplied to an audio signal processing circuit 18 through the switching circuit 1. The audio signal processing circuit 18 executes processes such as preemphasis and the like. An output of the audio signal processing circuit 18 is supplied to the input terminal on the A side of the switching circuit 3.

In the analog mode, the switching circuit 3 is connected to A side in the audio transmission mode. In the audio transmission mode, therefore, the digital audio signal from the audio signal processing circuit 18 is supplied to a digital frequency modulating circuit 22 through the switching circuit 3.

In the wide band data transmission mode in the analog mode, data from an input terminal 19 is supplied to a wide band data processing circuit 20. A clock of a frequency $f_{WD}$ ($f_{WD} = 20$ kHz) is supplied from a terminal 21 to the wide band data processing circuit 20. An output of the wide band processing circuit 20 is supplied to the input terminal on the B side of the switching circuit 3.

In the wide band data transmission mode in the analog mode the switching circuit 3 is connected to B side. In the data transmission mode, therefore, the output data from the wide band data processing circuit 20 is supplied to the digital frequency modulating circuit 22 through the switching circuit 3.

A carrier of a frequency $f_{AB}$ ($f_{AB}$=120 kHz) is supplied to the digital frequency modulating circuit 22 from a terminal 23. The digital frequency modulating circuit 22 frequency modulates the digital audio signal from the audio signal processing circuit 18 or the output data from the wide band data processing circuit 20.

An output of the modulating circuit 22 is supplied to an n-times multiplying circuit 24 (n=81). The frequency of the output signal of the modulating circuit 22 is multiplied with n times (n=81) by the n-times multiplying circuit 24. Since the frequency of the output signal of the modulating circuit 22 is equal to 120 kHz, a signal of a frequency of 9.72 MHz (120 kHz×81=9.72 MHz) is generated from the n-times multiplying circuit 24.

In the analog mode, the switching circuit 2 is connected to B side. Therefore, an output of the n-times multiplying circuit 24 is supplied to the orthogonal modulating and D/A converting circuit 12 through the switching circuit 2. The IF signal of the intermediate frequency $f_{IF}$ ($f_{IF}$=12.15 MHz) is derived from the circuit 12. The IF signal is supplied to the mixing circuit 14. The local oscillation signal of the frequency $f_{SOSC}$ is supplied from the PLL synthesizer 15 to the mixing circuit 14. The mixing circuit 14 mixes the IF signal and the local oscillation signal of the frequency of $f_{SOSC}$, thereby forming a transmission signal of a band of the frequency of 800 MHz. The transmission signal is supplied to the power amplifier 16 and amplified. The output of the power amplifier 16 is supplied to the antenna 17 through the duplexer 4.

The reception side will now be described. On the reception side, switching circuit 31 and 32 are switched in accordance with the digital mode and the analog mode. In the digital mode, the switching circuits 31 and 32 are connected to A side. In the analog mode, the switching circuits 31 and 32 are connected to B side.

In the analog mode, a switching circuit 33 is switched in accordance with the audio reception mode and the wide band data reception mode. In the audio reception mode, the switching circuit 33 is connected to A side. In the wide band data reception mode, the switching circuit 33 is connected to B side.

In the digital mode, a reception output from the antenna 17 is supplied to an RF amplifier 35 through the duplexer 4. An output of the RF amplifier 35 is supplied to a mixing circuit 36. A local oscillation signal of a frequency $f_{ROSC}$ is supplied from the PLL synthesizer 15 to the mixing circuit 36. The mixing circuit 36 converts the reception signal into the IF signal of a frequency of 12.15 MHz. The IF signal is supplied to an A/D converting and orthogonal demodulating circuit 37.

A sample clock of the frequency $f_S$ ($f_S$=9.72 MHz) is supplied form a terminal 54 to the A/D converting and orthogonal demodulating circuit 37. The circuit 37 samples the IF signal of a frequency of 12.15 MHz by the sampling clock of a frequency of 9.72 MHz and sequentially selects the sampling data by the sampling clock of a frequency of 9.72 MHz, thereby demodulating the real part signal I and the imaginary part signal Q of the complex base band signal.

An output of the circuit 37 is supplied to the switching circuit 31. Since the switching circuit 31 is connected to the A side in the digital mode, the output of the circuit 37 is supplied to a 1/m frequency dividing circuit 38 (m=100) through the switching circuit 31.

Since the demodulation data of a transfer rate of a frequency of 9.72 MHz is obtained from the A/D converting and orthogonal demodulating circuit 37, the data of a transfer rate of a frequency of 97.2 kHz is derived from the 1/m frequency dividing circuit 38. An output of the 1/m frequency dividing circuit 38 is supplied to a DPSK demodulating circuit 39.

A carrier of a frequency $f_{DB}$ ($f_{DB}$=97.2 kHz) is supplied from a terminal 52 to the DPSK demodulating circuit 39. The DPSK demodulating circuit 39 demodulates the reception data of a data rate of 24.3 kHz. The demodulation signal is supplied to a channel coder 40.

The channel coder 40 separates the audio data and the control data from the TDMA frame. An output of the channel coder 40 is supplied to a codec 41.

The codec 41 decodes by using VSELP. The transmitted audio signal is decoded by the codec 41. The decoded digital audio signal is supplied to the input terminal on the A side of the switching circuit 32.

Since the switching circuit 32 is connected to the A side in the digital mode, the decoded audio signal is supplied to a D/A converter 42 through the switching circuit 32. A clock of the frequency $f_A$ ($f_A$=8 kHz) is supplied from a terminal 43 to a D/A converter 42. The D/A converter 42 converts the digital audio signal into the analog audio signal. The analog audio signal is generated from an output terminal 44.

In the analog transmission mode, the reception output from the antenna 17 is supplied to the mixing circuit 36 through the duplexer 4 and the RF amplifier 35. In the mixing circuit 36, the reception signal is converted into the IF signal of a frequency of 12.15 MHz. The IF signal is supplied to the A/D converting and orthogonal demodulating circuit 37. The circuit 37 converts the reception signal into the digital signal.

An output of the circuit 37 is supplied to the switching circuit 31. Since the switching circuit 31 is connected to the B side in the analog mode, the output of the A/D converting and orthogonal demodulating circuit 37 is supplied to a 1/n frequency dividing circuit 45 (n=81) through the switching circuit 31. Audio data of a transfer rate of a frequency of 120 kHz or wide band data is derived from the 1/n frequency dividing circuit 45. An output of the 1/n frequency dividing circuit 45 is supplied to a digital frequency demodulating circuit 46.

A carrier of the frequency $f_{AB}$ ($f_{AB}$=120 kHz) is supplied from a terminal 47 to the digital frequency demodulating circuit 46 and demodulates the digital audio signal or wide band data. The demodulated data is supplied to the switching circuit 33.

In the analog transmission mode, the switching circuit 33 is connected to A side in the audio reproduction mode. In the audio reproduction mode in the analog transmission mode, therefore, the digital audio signal demodulated by the digital frequency demodulating circuit 46 is supplied to an audio signal processing circuit 48 through the switching circuit 33.

The audio signal processing circuit 48 executes processes such as deemphasis and the like. An output of the audio signal processing circuit 48 is supplied to the input terminal on the B side of the switching circuit 32. In the analog mode, the switching circuit 32 is connected to B side. The digital audio signal from the audio signal processing circuit 48 is, therefore, supplied to the D/A converter 42 through the switching circuit 32. The D/A converter 42 converts the digital audio signal into the analog audio signal. The analog audio signal is generated from the output terminal 44.

In the wide band data outputting mode in the analog transmission mode, the switching circuit 33 is connected to B side. In the wide band data outputting mode in the analog transmission mode, therefore, the digital data demodulated by the digital frequency demodulating circuit 46 is supplied to a wide band data processing circuit 49 through the switching circuit 33. A clock of the frequency $f_{WD}$ ($f_{WD}=20$ kHz) is supplied from a terminal 50 to the wide band data processing circuit 49. Data from the processing circuit 49 is generated from an output terminal 51.

As mentioned above, the orthogonal modulating and D/A converting circuit 12 sequentially selects the positive and negative signals I and −I of the real part of the complex base band signal and the positive and negative signal Q and −Q of the imaginary part and D/A converts by the sampling frequency $f_S$ and extracts the component of a predetermined band, thereby executing the orthogonal modulation. The orthogonal modulating and D/A converting circuit 12 will now be described in detail.

Figure 2:
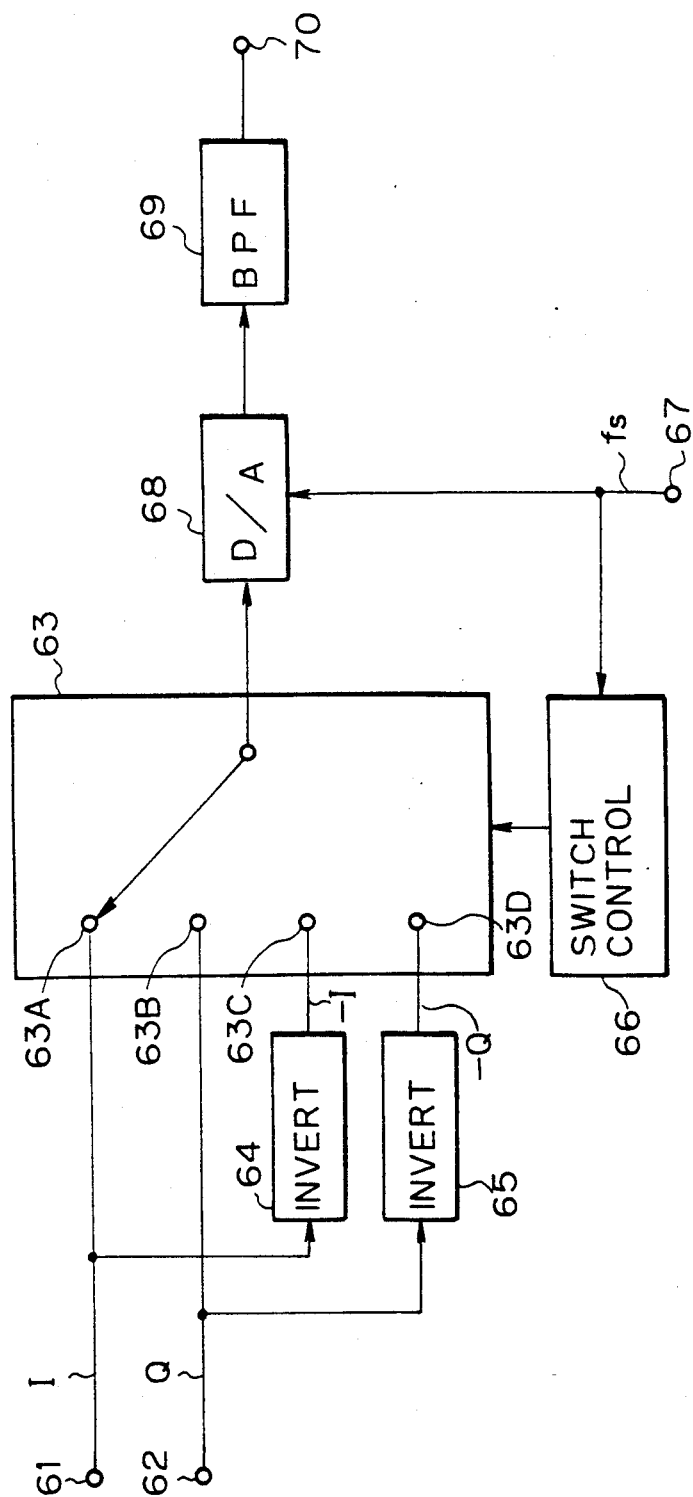
FIG. 2 is a block diagram of an example of an orthogonal modulating and D/A converting circuit in the embodiment of the invention.

FIG. 2 shows a construction of the orthogonal modulating and D/A converting circuit 12. In FIG. 2, the real part signal I of the digital complex signal (I+jQ) is supplied to an input terminal 61. The imaginary part signal Q of the digital complex signal (I+jQ) is supplied to an input terminal 62.

The real part signal I from the input terminal 61 is supplied to an input terminal 63A of a switching circuit 63 and is also supplied to a polarity inverting circuit 64. The polarity inverting circuit 64 inverts the polarity of the real part signal I, thereby forming the real part signal −I. The real part signal −I is supplied to an input terminal 63C of the switching circuit 63.

The imaginary part signal Q from the input terminal 62 is supplied to an input terminal 63B of the switching circuit 63 and is also supplied to a polarity inverting circuit 65. The polarity inverting circuit 65 inverts the polarity of the imaginary part signal Q, thereby forming the imaginary part signal −Q. The imaginary part signal −Q is supplied to an input terminal 63D of the switching circuit 63.

A switching control signal is supplied from a switch control circuit 66 to the switching circuit 63. A clock of the sampling frequency $f_S$ is supplied from a terminal 67 to the switch control circuit 66. In the switching circuit 63, the signals I, Q, −I, and −Q which are supplied to the input terminals 63A to 63D of the switching circuit 63 are sequentially switched at the timings of the sampling frequency $f_S$.

An output of the switching circuit 63 is supplied to a D/A converter 68. A clock of the sampling frequency $f_S$ is supplied from the terminal 67 to the D/A converter 68. The D/A converter 68 converts the output of the switching circuit 63 into the analog signal.

An output of the D/A converter 68 is supplied to a band pass filter 69. The band pass filter 69 has characteristics such as to allow the signal of the band of the carrier frequency $f_{IF}$ to pass. An orthogonal modulation signal is derived from an output of the band pass filter 69. The orthogonal modulation signal is taken out from an output terminal 70.

The sampling frequency $f_S$ and the carrier frequency $f_{IF}$ are set so as to satisfy the following relation.

$$F_{IF}=f_S(2n+1)/4$$

(n: integer)

In the above example, the sampling frequency $f_S$ is set to 9.72 MHz and the carrier frequency $f_{IF}$ is set to 12.15 MHz. Therefore, the above relation is satisfied as follows.

$$12.15 \text{ MHz}=9.72 \text{ MHz } (2\times2+1)/4$$

By setting the relation between the sampling frequency $f_S$ and the carrier frequency $f_{IF}$ as mentioned above, the complex signals, I, Q, −I, and −Q are sequentially switched at the timings of the sampling frequency $f_S$ and D/A converted and the converted analog signals are taken out through the band pass filter of the frequency $f_{IF}$, so that the orthogonal modulation signal can be obtained.

Figure 3A:
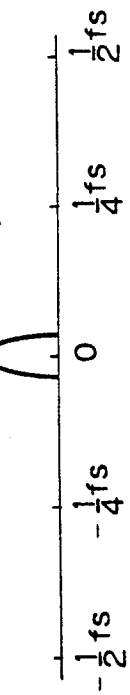
FIGS. 3A-3D are waveform diagrams which are used to explain an example of an orthogonal modulating and D/A converting circuit in the embodiment of the invention.
Figure 3B:
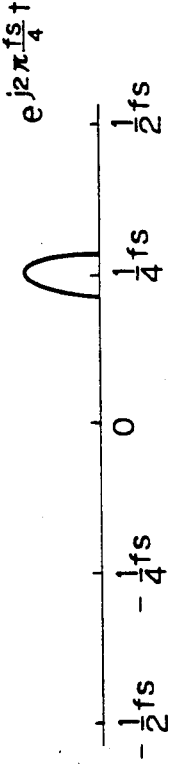
Figure 3C:
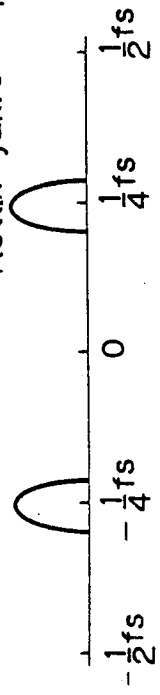

That is, it is now assumed that the complex signals I, Q, −I, and −Q are sequentially sampled by a frequency which is 4N (N=integer) times as high as the sampling frequency $f_S$ and are D/A converted. The resultant signals are equivalent to the real part (FIG. 3C)

$$Re[(I+jQ)\times exp(j2\pi/f_S/4)t)]$$

in the case where the complex signal (I+jQ) shown in FIG. 3A has been frequency converted by a signal $exp(j2\pi(f_S/4)t)$ shown in FIG. 3B.

By converting the above signal into the analog signal, the signal which has been orthogonal modulated to the frequency of $$f_S\cdot(2n+1)/4$$

Figure 3D:
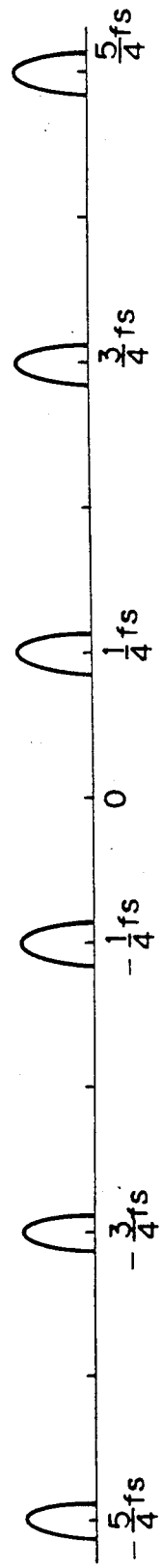

(n: integer)

as shown in FIG. 3D is derived from the sampling theory. A desired signal component is extracted from those signal components by the band pass filter 69. In this case, the signal component of $$f_S\cdot(2\cdot2+1)/4=(5/4)f_S$$

is taken out by the band pass filter 69. Therefore, the orthogonal conversion output in which the carrier of the frequency $f_{IF}$ has been orthogonal modulated by the digital complex signal (I+jQ) of the sampling frequency $f_S$ is obtained from the band pass filter 69.

In the example, although the complex signals, I, Q, −I, and −Q are sequentially selected, the complex signals I, −Q, −I, and Q can be also sequentially selected.

As mentioned above, when there is the following relation between the sampling frequency $f_S$ and the carrier frequency $f_{IF}$ $$f_{IF}=f_S(2n+1)/4,$$

the complex signals I, Q, −I, and −Q are sequentially switched at the timings of the sampling frequency $f_S$ and D/A converted and the resultant signals are taken out through the band pass filter of the frequency $f_{IF}$, so that the orthogonal modulation signal can be derived. The A/D converting and orthogonal demodulating circuit 37 in FIG. 1 can be realized by a circuit which executes the operation opposite to the above operation.

As mentioned above, according to the automobile cellular telephone terminal to which the invention is applied, even in any of the digital transmission mode and the analog transmission mode, the frequencies of the signals which are given to the orthogonal modulating and D/A converting circuit 12 are set to a common frequency (9.72 MHz). As mentioned above, even in any of the digital transmission mode and the analog transmission mode, in order to give the signal of the common frequency to the orthogonal modulating and D/A converting circuit 12, it is necessary to set the common multiple of the carrier frequency $f_{DB}$ in the digital transmission mode and the carrier frequency $f_{AB}$ in the analog transmission mode to the frequency of the signal which is given to the orthogonal modulating and D/A converting circuit 12. According to the embodiment of the invention, the carrier frequency $f_{DB}$ in the digital transmission mode is set to 97.2 kHz and the carrier frequency $f_{AB}$ in the analog transmission mode is set to 120 kHz.

$$97.2 \text{ kHz} \times 100 = 9.72 \text{ MHz}$$

$$120 \text{ kHz} \times 81 = 9.72 \text{ MHz}$$

Therefore, the common multiple of the carrier frequency $f_{DB}$ in the digital transmission mode and the carrier frequency $f_{AB}$ in the analog transmission mode is equal to the frequency of the signal which is given to the orthogonal modulating and D/A converting circuit 12.

The sampling frequency of the audio signal is equal to 8 kHz. The frequency of 9.72 MHz of the signal which is given to the circuit 12 is also integer times as high as the sampling frequency of the audio signal. Therefore, by setting a frequency of the master clock of a reference clock signal generating circuit 53 to a value which is integer times as high as 9.72 MHz, the carrier frequency $f_{DB}$ in the digital transmission mode and the carrier frequency $f_{AB}$ in the analog transmission mode can be easily set to 120 kHz and the sampling frequency of the audio signal can be easily set to 8 kHz.

Further, the frequency of 9.72 MHz is integer times as high as 30 kHz corresponding to the channel interval of the transmitting frequency and is also integer times as high as the transmission rate $f_{WD}$ (20 kHz) of the wide band data in the analog mode. Consequently, by setting the frequency of the master clock of the reference clock signal generating circuit 53 to a value which is integer times as high as 9.72 MHz, the signal which is necessary for each section can be easily formed. According to the embodiment of the invention, the frequency of the master clock of the reference clock signal generating circuit 53 is set to the frequency of 19.44 MHz which is twice as high as 9.72 MHz.

It will be obviously understood that signal in each section in the reception mode can be also similarly formed by setting the frequency of the master clock of the reference clock signal generating circuit 53 to a value which is integer times as high as 9.72 MHz.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A transmitting apparatus comprising:

A/D converting means for converting an input audio signal into a digital audio signal;

mode setting means which is switched between a digital transmission mode to transmit a digitally modulated audio signal and an analog transmission mode to transmit an analog modulated audio signal;

digital transmission signal processing means to which the digital audio signal is given when said mode setting means is set into the digital transmission mode and which encodes the digital audio signal and modulates a first carrier by the coded signal;

analog transmission signal processing means which modulates a second carrier by the digital audio signal when the mode setting means is set into the analog transmission mode;

first multiplying means for multiplying a frequency of an output signal of the digital transmission signal processing means by integer times;

second multiplying means for multiplying a frequency of an output signal of the analog transmission signal processing means by integer times;

orthogonal modulating and D/A converting means for orthogonal modulating an output of the first multiplying means or an output of the second multiplying means and for D/A converting; and reference signal generating means for supplying signals of necessary frequencies to the A/D converting means, the digital transmission signal processing means, and the analog transmission signal processing means on the basis of a reference frequency signal, wherein the frequency of the reference frequency signal is set to a common multiple of a coding rate of the A/D converting means, a frequency of the first carrier, and a frequency of the second carrier.

2. An apparatus according to claim 1, wherein multiplying ratios of said first and second multiplying means are selected so that the carrier frequency of the signal which is supplied to the orthogonal modulating and D/A converting means is set so as to be equal in both of the digital transmission mode and the analog transmission mode.

3. An apparatus according to claim 1, further having transmitting frequency setting means for setting a transmitting frequency every predetermined frequency interval, and wherein the frequency of the reference frequency signal is set to a common multiple of the coding rate of the A/D converting means, the frequency of the first carrier, the frequency of the second carrier, and said frequency interval.

4. An apparatus according to claim 3, further having transmission data processing means for enabling data to be transmitted in the analog transmission mode, and wherein the frequency of the reference frequency signal is set to a common multiple of the coding rate of the A/D converting means, the frequency of the first carrier, the frequency of the second carrier, the frequency interval, and a data rate of said data.

5. An apparatus according to claim 1, wherein when it is assumed that the coding rate of the A/D converting means is equal to 8 kHz and the frequency of the first carrier is equal to 97.2 kHz and the frequency of the second carrier is equal to 120 kHz, the frequency of the reference frequency signal is set to a value which is integer times as high as 9.72 MHz.

6. An apparatus according to claim 2, wherein when it is assumed that the frequency of the first carrier is equal to 97.2 kHz and the frequency of the second carrier is equal to 120 kHz, the multiplying ratio of the first multiplying means is set to 100 and the multiplying ratio of the second multiplying means is set to 81, thereby allowing the signal of the carrier frequency of 9.72 MHz which is equal in both of the digital transmission mode and the analog transmission mode to be given to the orthogonal modulating and D/A converting means.

7. An apparatus according to claim 3, wherein the frequency of the reference frequency signal is set to a value which is integer times as high as 9.72 MHz, the coding rate of the A/D converting means is set to 8 kHz, the frequency of the first carrier is set to 97.2 kHz, the frequency of the second carrier is set to 120 kHz, and the transmitting frequency interval which is set by the transmitting frequency setting means is set to 30 kHz.

8. An apparatus according to claim 4, wherein the frequency of the reference frequency signal is set to a value which is integer times as high as 9.72 MHz, the coding rate of the A/D converting means is set to 8 kHz, the frequency of the first carrier is set to 9.72 kHz, the transmitting frequency interval which is set by the transmitting frequency setting means is set to 30 kHz, and the transmission rate of the data which is processed by the transmission data processing means is set to 20 kHz.

9. A receiving apparatus comprising:
A/D converting and orthogonal demodulating means for A/D converting and orthogonal demodulating a reception signal;
mode setting means which is switched in accordance with a digital transmission mode to receive a digitally modulated audio signal and an analog transmission mode to receive an analog modulated audio signal;
first frequency dividing means to which an output of the A/D converting and orthogonal demodulating means is supplied and which forms a signal of a first carrier frequency;
second frequency dividing means to which the output of the A/D converting and orthogonal demodulating means is supplied and which forms a signal of a second carrier frequency;
digital reception signal processing means for demodulating an output of the first frequency dividing means when the mode setting means is set into the digital transmission mode and for decoding the demodulated signal and forming a first digital audio signal;
analog audio signal processing means for demodulating an output of the second frequency dividing means when the mode setting means is set into the analog transmission mode and for forming a second digital audio signal;
D/A converting means for converting the first or second digital audio signal from the digital reception signal processing means or the analog reception signal processing means into an analog audio signal; and
reference signal generating means for supplying signal of necessary frequencies to the digital reception signal processing means, the analog reception signal processing means, and the D/A converting means,
wherein a frequency of the reference frequency signal is set to a common multiple of the frequency of the first carrier, the frequency of the second carrier, and a coding rate of the digital audio signal.

10. An apparatus according to claim 9, wherein frequency dividing ratios of the first and second frequency dividing means are selected in a manner such that when a carrier of a frequency which is equal in both of the digital transmission mode and the analog transmission mode is generated from the A/D converting and orthogonal demodulating means, a signal of the first carrier frequency is supplied to the digital reception signal processing means and a signal of the second carrier frequency is supplied to the analog reception signal processing means.

11. An apparatus according to claim 9, further having receiving frequency setting means for setting a receiving frequency every predetermined frequency interval, and wherein a frequency of the reference frequency signal is set to a common multiple of the frequency of the first carrier, the frequency of the second carrier, a coding rate of the digital audio signal, and said frequency interval.

12. An apparatus according to claim 11, further having reception data processing means for enabling data to be transmitted in the analog transmission mode, and wherein the frequency of the reference frequency signal is set to a common multiple of the frequency of the first carrier, the frequency of the second carrier, the coding rate of the digital audio signal, the frequency interval, and a data rate of said data.

13. An apparatus according to claim 9, wherein when it is assumed that the frequency of the first carrier is equal to 97.2 kHz and the frequency of the second carrier is equal to 120 kHz and the coding rate of the digital audio signal is equal to 8 kHz, the frequency of the reference frequency signal is set to a value which is integer times as high as 9.72 MHz.

14. An apparatus according to claim 10, wherein when a signal of the carrier frequency is 9.72 MHz which is equal in both of the digital transmission mode and the analog transmission mode is generated from the A/D converting and orthogonal modulating means, a frequency dividing ratio of the first frequency dividing means is set to 1/100, a frequency dividing ratio of the second frequency dividing means is set to 1/81, the signal of the first carrier frequency of 97.2 kHz is generated from the first frequency dividing means in the digital transmission mode, and the signal of the second carrier frequency of 120 kHz is generated from the second frequency dividing means in the analog transmission mode, respectively.

15. An apparatus according to claim 11, wherein the frequency of the reference frequency signal is set to a value which is integer times as high as 9.72 MHz, the frequency of the first carrier is set to 97.2 kHz, the frequency of the second carrier is set to 120 kHz, the coding rate of the digital audio signal is set to 8 kHz, and the receiving frequency interval which is set by the receiving frequency setting means is et to 30 kHz.

16. An apparatus according to claim 12, wherein the frequency of the reference frequency signal is set to a value which is integer times as high as 9.72 mHz, the frequency of the first carrier is set to 97.2 kHz, the frequency of the second carrier is set to 120 kHz, the coding rate of the digital audio signal is set to 8 kHz, the receiving frequency interval which is set by the receiving frequency setting means is set to 30 kHz, and transmission rate of the data which is processed by the reception data processing means is set to 20 kHz.

* * * * *